W. F. EVANS.
NUT LOCK.
APPLICATION FILED MAR. 2, 1920.

1,357,389.

Patented Nov. 2, 1920.

Witnesses
Geo. A. Gruss
Augustus B. Copper

Inventor
William F. Evans
By Joshua R. H. Potts
his Attorney

UNITED STATES PATENT OFFICE.

WILLIAM F. EVANS, OF NEW YORK, N. Y., ASSIGNOR OF ONE-NINTH TO NICOLO FIGLIOLO, OF NEW YORK, N. Y.

NUT-LOCK.

1,357,389.  Specification of Letters Patent.  Patented Nov. 2, 1920.

Application filed March 2, 1920. Serial No. 362,839.

*To all whom it may concern:*

Be it known that I, WILLIAM F. EVANS, a citizen of the United States, residing at New York, in the county of New York and State of New York, have invented certain new and useful Improvements in Nut-Locks, of which the following is a specification.

One object of my invention is to provide means of simple and durable construction which will securely lock a nut upon a bolt so as to prevent the nut from accidentally becoming loose from or falling off said bolt.

Another object is to make my improved nut lock in such manner that it can be easily and cheaply manufactured so that the expense of making the same will not prevent it from being adopted for use any place where it is desirable to lock a nut upon a bolt.

Figure 1:
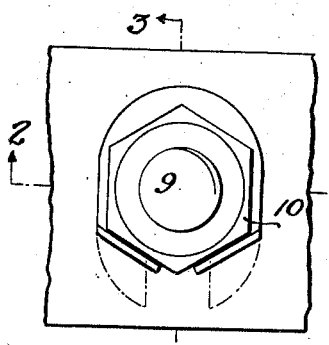
Figure 5:
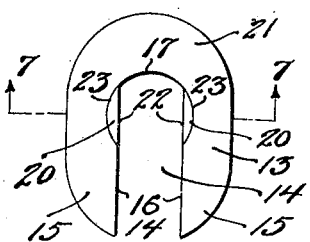
Figure 6:
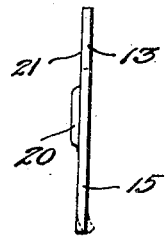
Figure 7:
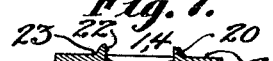
Figure 2:
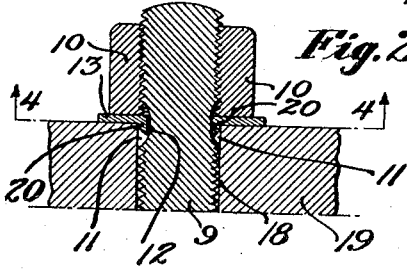
Figure 3:
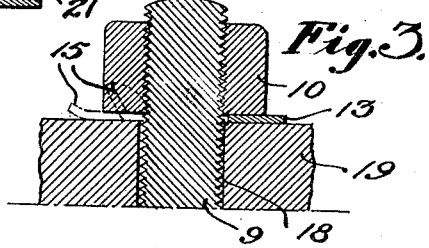
Figure 8:
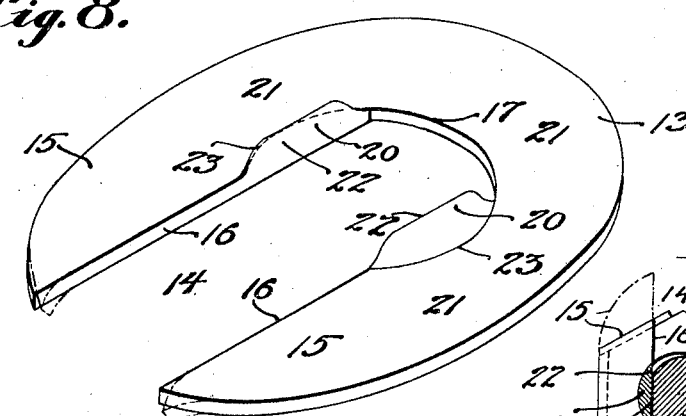
Figure 4:
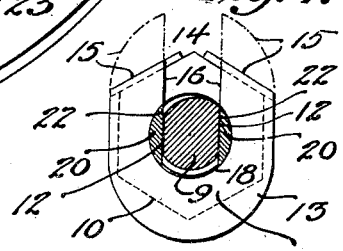

These objects, and other advantageous ends which will be described hereinafter, I attain in the following manner, reference being had to the accompanying drawings in which Figure 1 is a top plan view showing in full lines my improved nut lock in use securing a nut upon a bolt and illustrating in dot-and-dash lines a position of a portion of said locking means before the same is bent to lock the nut, Fig. 2 is a fragmentary sectional elevation taken on the line 2—2 of Fig. 1, Fig. 3 is a fragmentary sectional elevation taken on the line 3—3 of Fig. 1 and showing in dot-and-dash lines the portion of the washer which is indicated in dot-and-dash lines in Fig. 1, Fig. 4 is a sectional plan view taken on the line 4—4 of Fig. 2, Fig. 5 is an inverted plan view of the improved interlocking split washer which forms a part of my invention, Fig. 6 is an edge view looking in the direction of the side of the washer shown in Fig. 5 and illustrating in dot-and-dash lines how a portion of said washer can be initially slightly bent so as to facilitate the bending of said portion into the locking position such as shown in full lines in Fig. 1, Fig. 7 is a sectional view taken on the line 7—7 of Fig. 5, and Fig. 8 is a perspective view showing the under face and lips of said interlocking washer.

Referring to the drawings, 9 represents the screw threaded stem or shank of a bolt having a standard nut 10 screwed thereon; said nut in the present instance being illustrated as hexagonal. The bolt stem below the nut is cut away at portions diametrically opposite as shown at 11, and this cutting away of the bolt stem can be done by milling, punching or any other suitable means so as to provide flat surfaces 12 which are preferably parallel. In other words, the screw threaded portion of the bolt stem is cut away within its length and the depth of these cut away portions may vary according to the diameter of the bolt.

An interlocking split washer 13, which may be stamped out of sheet metal in the shape clearly illustrated in Figs. 5 to 8 inclusive, includes a slot or notch 14 providing prongs 15 which have inner parallel straight edges 16 which terminate in a curved edge 17 at their innermost portions; said curved edge being arcuate and of a radius equal to the curvature of the outer diameter of the bolt stem or hole through which the bolt stem is to be placed, such for example as the hole 18 in an article 19 through which the bolt stem is projected.

The center of the radius of the curved edge 17 is midway between the side edges 16 of the washer and said washer is pressed or otherwise formed to provide two lips 26 which project downwardly from the lower surface 21; said lips being tapered in cross section as clearly shown in Fig. 7 and having inner flat side edges 22 which are respectively flush or coincident with the surfaces of the edges 16 so that said surfaces of the edges 16 are flush or in the same plane with the edges 22 of the lips 20. The lips 20 intercept the under surface 21 in curves 23 which have the same radius and center as the curved edge 17 so that on the surface 21, the lips 20 and edge 17 intercept said surface 21 to produce a partial circle having its ends leading respectively to the edges 16 as clearly shown in Fig. 5.

The width between the edges 16 is substantially the same as the edge between the flat surfaces 12 and the length or height of the cut away portions 11 is such as to permit the washer 13 to be slipped in an embracing position with the bolt stem 9 with the lips 20 occupying the space provided by the cut away portions 11 so that said lips in the direction of the diameter of the bolt stem form a filling for the spaces to take the place of the metal which was cut away from the bolt stem at the positions indicated at 11. Also, due to the fact that the curved portions of the lips which intercept the nut surface 21 of the washer is substantially of the same radius as the cross section of the bolt and hole, the lips at their outer surfaces will snugly fit down into the hole 18 and when the nut 10 is screwed thereon the lips 20 will be confined within the hole 18 preventing the spreading of the prongs of the washer and also serving to firmly hold or press against the flat surfaces 12 of the bolt stem 9 to prevent relative rotation between the washer and the bolt. The prongs 15 are made sufficiently long as indicated in dot-and-dash lines in Fig. 1 that after the nut has been screwed tightly down upon the washer said prongs can be bent upwardly against any of the side surfaces of the nut or if desired any other projecting parts of the washer can be bent upwardly against the angular side surfaces of the nut to prevent relative rotation between the nut and washer. I preferably slightly bend up the outer ends of the prongs 15 as is shown in dot-and-dash lines in Figs. 3, 6 and 8 so that after the washer has been placed in position and the nut screwed down, a chisel or other tool can be inserted under the ends of the prongs 15 and bent upwardly into the full line positions shown in Fig. 1 so as to lock the nut against rotation relatively to the washer.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A nut lock including a bolt having a screw threaded stem cut away at opposite sides within its length and adapted to be projected through a hole in an article; and an interlocking washer having a notch therein providing prongs, the side edges of said prongs being adapted to be slipped in embracing position with respect to said cut away portion of the bolt, said washer having lips oppositely disposed on said prongs and adapted to extend into said hole of the article, said washer having portions adapted to be bent into embracing position with the sides of said nut; substantially as described.

2. A nut lock including a bolt having a screw threaded stem cut away at opposite sides within its length and adapted to be projected through a hole in an article; and an interlocking washer having a notch therein providing prongs, the side edges of said prongs being adapted to be slipped in embracing position with respect to said cut away portion of the bolt, said washer having lips oppositely disposed on said prongs and adapted to extend into said hole of the article, said washer having portions adapted to be bent into embracing position with the sides of said nut, said lips intercepting the lower surface of said washer in the form of curves substantially equal to the curvature of said hole; substantially as described.

3. A nut lock including a bolt having a screw threaded stem cut away at opposite sides within its length and adapted to be projected through a hole in an article; and an interlocking washer having a notch therein providing prongs, the side edges of said prongs being adapted to be slipped in embracing position with respect to said cut away portion of the bolt, said washer having lips adapted to extend into said hole of the article, said washer having portions adapted to be bent into embracing position with the sides of said nut, said lips intercepting the lower surface of prongs of said washer in the form of curves substantially equal to the curvature of said hole, the inner surfaces of said lips extending into close proximity to the surfaces of said bolt stem formed by said cut away portions thereof; substantially as described.

4. A nut lock including a bolt having a screw threaded stem cut away at opposite sides within its length and adapted to be projected through a hole in an article; and an interlocking washer having a notch therein providing prongs, the inner side edges of said prongs adjacent their innermost parts being substantially straight and parallel, said washer having lips oppositely disposed on said prongs, said lips having inner surfaces substantially flush with said edges of the prongs and projecting from the lower surfaces of said prongs, said lips intersecting said lower surfaces of the prongs in curves conforming to the curvature of the inner surface of said bolt hole, said washer having portions adapted to be bent into embracing position with the sides of a nut on said bolt, said nut being operative to hold said washer with said lips fitting within said hole; substantially as described.

In testimony whereof I have signed my name to this specification in the presence of two subscribing witnesses.

WILLIAM F. EVANS.

Witnesses:
 CHAS. E. POTTS,
 AUGUSTUS B. COPPES.